Michael P. Bolaski, Jr.
INVENTOR.

Feb. 24, 1970    M. P. BOLASKI, JR    3,497,233
FRONT VEHICLE SUSPENSION WITH AUTOMATIC CAMBER ADJUSTMENT
Filed Nov. 3, 1967    4 Sheets-Sheet 3

Michael P. Bolaski, Jr.
INVENTOR.

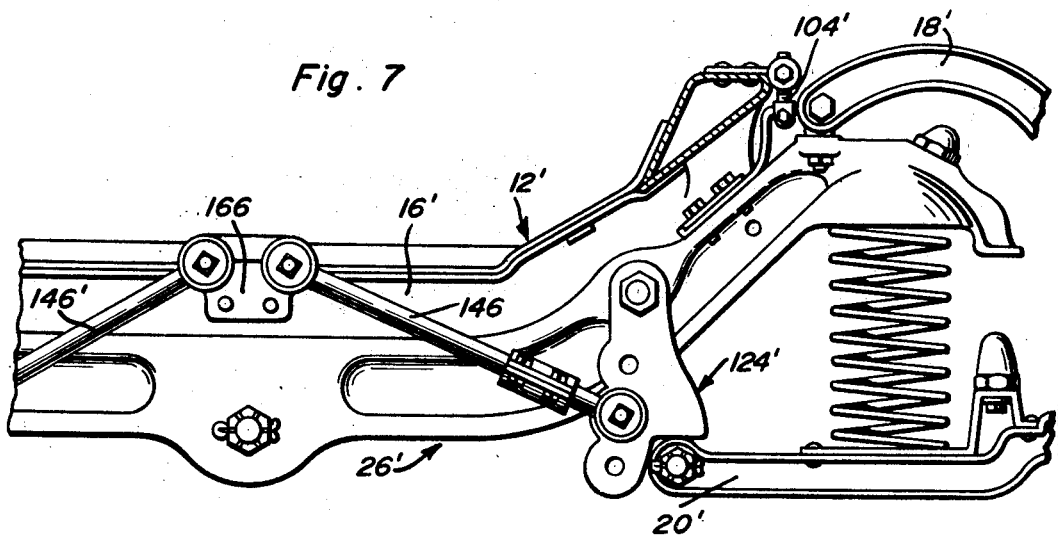
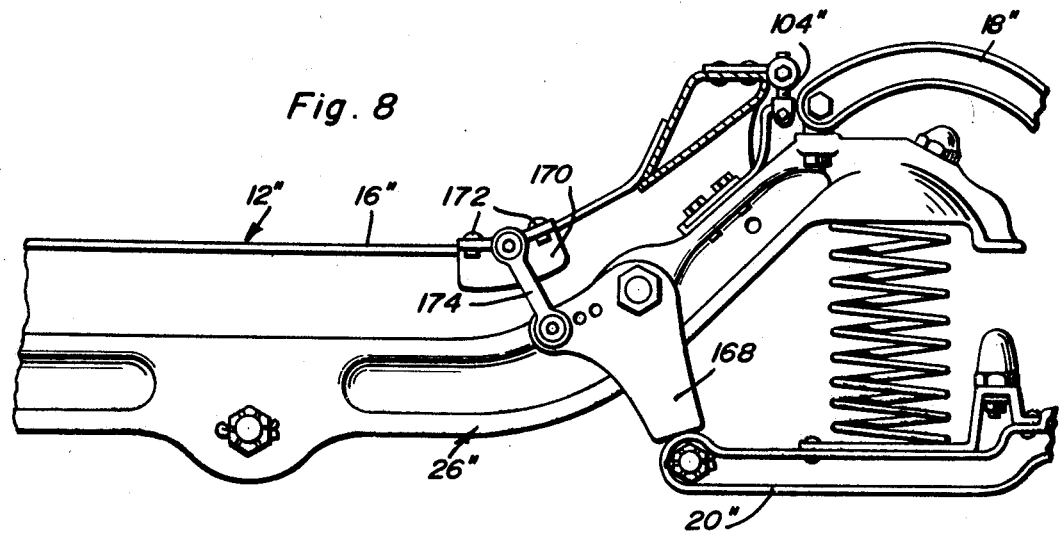

United States Patent Office 3,497,233
Patented Feb. 24, 1970

3,497,233
**FRONT VEHICLE SUSPENSION WITH AUTO-
MATIC CAMBER ADJUSTMENT**
Michael P. Bolaski, Jr., El Paso, Tex., assignor of seven percent to Luke R. Carrillo, and one percent to Orville L. Hensler, both of Los Angeles, Calif., one percent to Ronald W. Larson, Fort Bliss, Tex., one percent each to Robert C. Hawkins, Steadman M. Wallace, Marion L. Thompson, Hobart W. Proffitt, Ronald B. Newton, James W. Fitzgerald and Abraham S. Fuhr, three percent to Lillian R. Rubio and five percent to Glenn E. Woodard, all of El Paso, Tex.
Filed Nov. 3, 1967, Ser. No. 680,581
Int. Cl. B60g 3/26, 25/00
U.S. Cl. 280—96.2                          11 Claims

ABSTRACT OF THE DISCLOSURE

A wheel suspension assembly for a vehicle of the type including a frame portion, an axle portion supported from the frame portion for limited transverse shifting relative thereto in response to transverse inertia loading, a wheel spindle assembly supported from the axle portion for limited angular displacement about an axis extending longitudinally of the vehicle and defining a generally horizontal and transverse axis of wheel rotation, and motion transmitting means operatively associated with the frame and the axle portions and the spindle assembly for oscillating the spindle assembly in a direction to outwardly and upwardly incline the axis of wheel rotation defined by the wheel spindle assembly in response to shifting of the frame portion toward the wheel spindle assembly relative to the axle portion.

---

The suspension system of the instant invention, although primarily designed for use at the front portion of a motor vehicle, can also be utilized as a component of rear wheel suspension. If it is desired, each of the four wheels of a four-wheeled vehicle may be suspended from the frame portion of the vehicle in the manner taught by the instant invention. By utilizing the suspension system of the instant invention the camber of the wheels of the vehicle will be automatically adjusted to incline the upper portions of the wheels inwardly toward the center of a turn or toward the top of sloping terrain being traversed, whichever the maneuver. Furthermore, the adjustability of the camber of the wheels of a vehicle provided with the suspension system of the instant invention is automatically adjusted independently of steering control of the vehicle and proportionally in response to horizontal inertia or lateral forces acting upon the vehicle while executing a turn or traversing sloping terrain. Therefore, the amount the upper portion of the wheel of a vehicle are inclined inwardly toward the center of curvature of a turn being executed by the vehicle is increased as centrifugal forces acting upon the vehicle as a result of the latter executing the turn are increased.

By this automatic adjustment of camber during execution of the turn the effective underroll of the lower tread portion of the vehicle tires is greatly reduced thereby maintaining a greater portion of the tread of the tires of the vehicle in contact with the road surface and reducing, or in some cases completely eliminating, any portion of the side walls of the tires of a vehicle contacting the road surface cornering at high speeds. Of course, by maintaining a greater portion of the tread surface of the tires in contact with the road surface and by substantially reducing or completely eliminating side wall contact with the road surface greater cornering traction for resisting slides and skids is provided.

The main object of this invention is to provide a wheel suspension system for vehicles including means by which the camber of the wheels of the vehicle may be automatically adjusted in response to centrifugal forces acting upon the vehicle during execution of turns and in such a manner that the upper portion of the wheels of the vehicle are inclined inwardly toward the center of curvature of a turn being executed by the vehicle.

Another object of this invention, in accordance with the immediately preceding object, is to provide a wheel suspension assembly which may be readily incorporated into a manufacture of present-day vehicles.

Still another object of this invention is to provide a wheel suspension assembly including adjustments whereby the initial camber adjustment of the wheels of the associated vehicle may be readily made.

A further object of this invention, in accordance with the immediately preceding object, is to provide a wheel suspension assembly including means by which the amount of camber adjustment effected by the suspension assembly in response to given centrifugal forces acting upon the vehicle may be readily adjusted.

Another object is to provide a wheel suspension assembly which greatly reduces the transmissioner of road shocks from the wheels to the frame and body of the associated vehicle.

A final object of this invention to be specifically enumerated herein is to provide a wheel suspension assembly which will conform to conventional forms of manufacture, be of simple construction and easy to service so as to provide an assembly which will conform to conventiona forms of manufacture, and be operative for extended periods without excessive maintenance being performed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 7 is a view similar to FIGURE 2 but illustrating a first modified form of the suspension assembly; and FIGURE 8 is a view similar to FIGURES 2 and 7 and illustrating a second modified form of suspension assembly.

Figure 1:
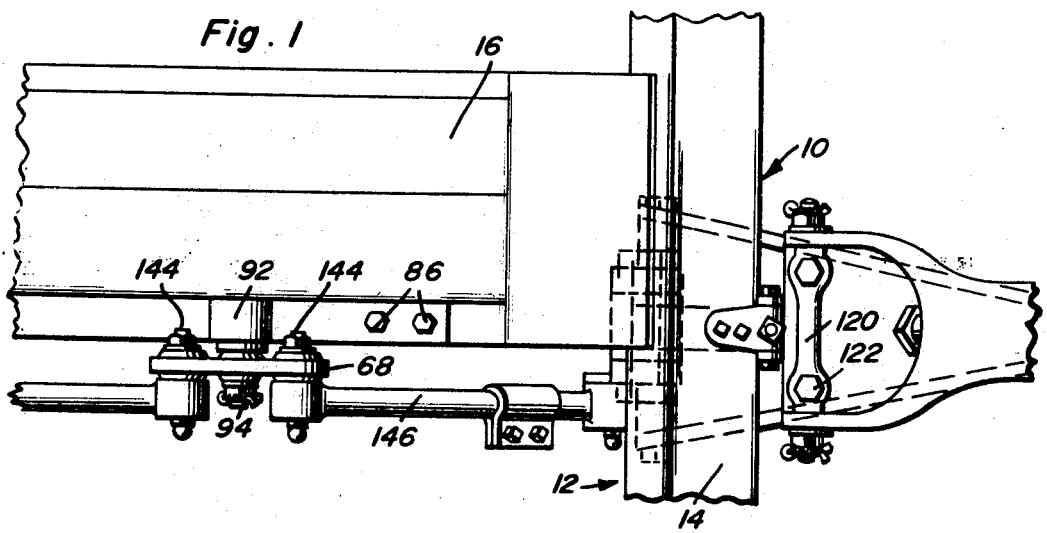
FIGURE 1 is a fragmentary top plan view of the front portion of a motor vehicle equipped with the suspension system of the instant invention.

Referring now more specifically to the drawings the numeral 10 generally designates a motor vehicle such as a passenger car including a frame portion referred to in general by the reference numeral 12 consisting of a pair of opposite side longitudinal frame members 14 interconnected by means of a transversely extending frame member 16. The vehicle 10 also includes a conventional front wheel suspension assembly including upper and lower control arms 18 and 20 and a wheel spindle assembly generally referred to by reference numeral 22. The wheel spindle assemblies are supported between the outer ends of the upper and lower control arms 18 and 20 for oscillation about upstanding axes and therefore it may be noted that the wheel spindle assemblies 22 oscillatably support the front steerable wheels of the vehicle therefrom.

Although the vehicle suspension specifically illustrated and described herein includes only dirigible wheel spindle assemblies, it is to be noted that the suspension assembly of the invention may also be utilized for supporting nondirigible wheel spindle assemblies and that the suspension assembly may therefore be used on all four wheels of a vehicle.

Figure 3:
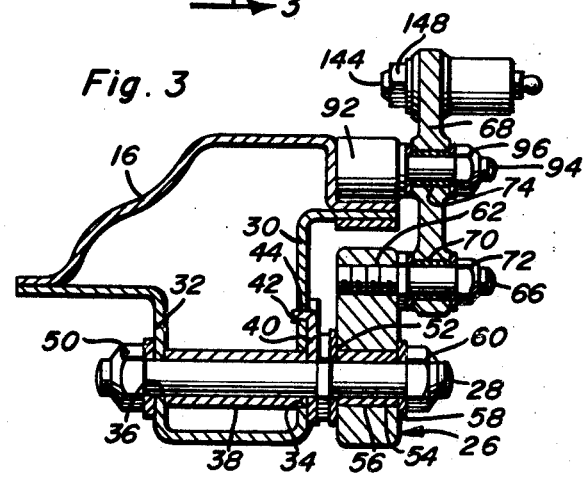
FIGURE 3 is a fragmentary enlarged vertical sectional view taken substantially upon the plane indicated by the section line 3—3 of FIGURE 2.
Figure 4:
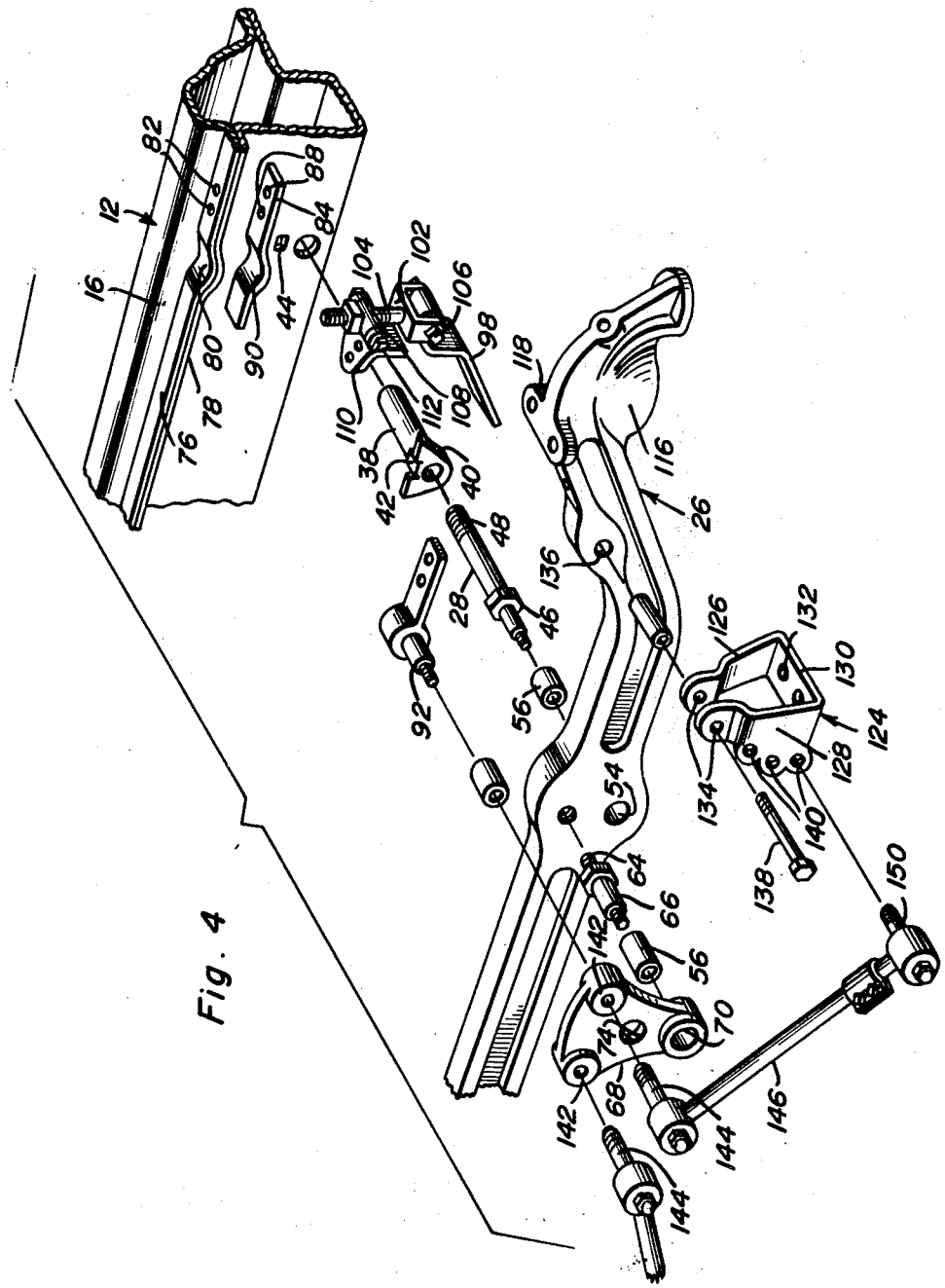
FIGURE 4 is an exploded perspective view of the components of the suspension system of the instant invention utilized on each vehicle wheel which is to be suspended for automatic camber adjustment.

Conventionally, the upper and lower control arms 18 and 20 would have their inner ends oscillatably supported from the frame member 14 with provisions for slight adjustment of the pivot axes of at least one of the control arms. However, the instant invention includes the provision of a transverse front axle assembly 26 which is pivotally supported, centrally intermediate its opposite end portion, from the transverse frame member 16 by means of a pivot fastener shaft 28. It may be seen from FIGURES 3 and 4 of the drawings that the transverse frame member 16 includes front and rear transverse walls 30 and 32 and that the walls 30 and 32 are provided with aligned apertures including a front larger aperture or bore 34 and a rear smaller aperture or bore 36. A reinforcing sleeve 38 is inserted rearwardly through the bore 34 and secured to the inner surfaces of the rear wall 32 in any convenient manner such as by welding while the forward end of the sleeve 38 is secured in the bore 34. In addition, the front plate 40 is carried by the forward end of the sleeve 38 and overlies the forward surface of the front wall 30 and includes a laterally struck and rearwardly directed tongue 42 which projects through a keying aperture 44 formed in the front wall 30 a spaced distance above the bore 34.

The pivot shaft or fastener 28 includes a diametrically enlarged non-circular head 446 intermediate its opposite ends and the rear end of the shaft 28 is externally threaded as at 48. The rear end portion of the shaft 28 is secured through the sleeve 38 by means of a threaded nut 50 engaged with the rear end portion of the shaft 28 and a thrust washer 52 is disposed over a forward end portion of the shaft 28 and abutted against the forward face of the diametrically enlarged portion 52.

The central portion of the front axle assembly 26 has a bore 54 formed therethrough and a sleeve 56 is disposed in the bore 54. The sleeve 56 is oscillatably supported from the forward end portion of the shaft 28 and abuts against the forward face of the thrust washer 52 and a threaded nut 60 is threadedly engaged on the forward end of the shaft 28 in front of the thrust washer 58. Thus, the axle assembly 26 is oscillatably supported from the transverse frame member 16.

The front axle assembly 26 includes a threaded bore 62 spaced above the bore 54 and the threaded end portion 64 of a second and somewhat smaller pivot shaft 66 is threadedly secured in the bore 62. The shaft 66 projects forwardly of the axle assembly 26 and has the lower portion of a pivot plate 68 pivotally supported therefrom by means of the forward end portion of the pivot shaft 66 being secured through a sleeved bore 70 with a threaded nut 72 being threadedly engaged with the forward end of the pivotal shaft 66.

The central portion of the pivot plate 68 is provided with a sleeved bore 74. The transverse frame member 16 includes forwardly projecting generally horizontal upper and lower flanges 76 and 78 which are secured together in any convenient manner and which are shaped to form an upwardly opening semi-cylindrical recess 80 and provided with aligned apertures 82. A reinforcing strap 84 is secured to the underside of the flange 78 by means of suitable fasteners 86 secured through the apertures 82 and apertures 88 formed in the reinforcing strap 84. It may be seen from FIGURE 4 of the drawings that the reinforcing strap 84 also defines an upwardly opening semi-cylindrical recess 90 which receives the downwardly displaced portions of the flanges 76 and 78 defining the recess 80 and the diametrically enlarged rear generally cylindrical portion 92 of a stationary pivot shaft 94 is secured in the recess 80 in any convenient manner such as by welding. The forward end of the pivot shaft 94 is secured through sleeved bore 74 by means of a threaded nut 96.

A pair of leaf springs 98 have corresponding ends secured to opposite end portions of the axle assembly 26 by means of suitable fasteners 100 and the other set of corresponding ends thereof have the bifurcated lower ends 102 of threaded support screws 104 oscillatably supported therefrom by means of pivot screws or shafts 106. The upper ends of the support screws 104 are threaded through sleeves 108 oscillatably supported from support brackets 110 provided therefor by pivot fasteners 112, the brackets 110 being secured to the corresponding longitudinal frame members 14 by means of suitable fasteners 114, see FIGURE 2.

Figure 2:
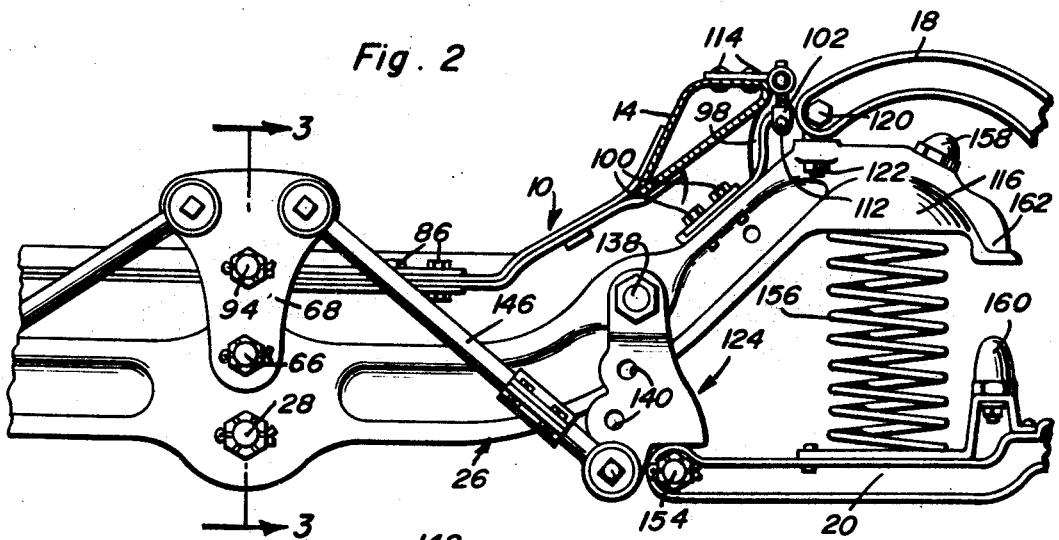
FIGURE 2 is a front elevational view of the assemblage illustrated in FIGURE 1.

Each end portion of the axle assembly 26 defines a downwardly opening coil spring seat portion 116 and the inner ends of the upper control arms 18 are oscillatably supported from the apertured mounting portions 118 provided therefor on the opposite ends of the axle assembly 26 by means of conventional pivot shafts 120 secured to the mounting portions 118 by means of suitable fasteners 122, see FIGURES 1 and 2.

Suitable generally U-shaped mounting brackets referred to in general by the reference numerals 124 are provided for supporting the inner ends of the lower control arm 20 from opposite end portions of the front axle assembly 26. The mounting brackets 124 include upstanding arm portions 126 and 128 interconnected at their lower ends by means of a lower bight portion 130 apertured as at 132 and the upper ends of the upstanding arm portions 126 and 128 are provided with aligned apertures 134. The mounting brackets 124 are supported from sleeved bores 136 formed through the opposite end portions of the axle assembly 26 by means of pivot fasteners 138 and each of the arm portions 128 includes a plurality of mounting apertures 140.

The pivot plate 68 includes a pair of upper mounting bores 142 through which pivot shaft shank portions 144 carried by adjustable link thrust rods 146 are secured by means of suitable fasteners 148. The other ends of the thrust rods 146 also include pivot shaft shank portions 150 and each are secured through a selected aperture or bore 140 formed in the corresponding mounting bracket 124. In this manner, the remote ends of the thrust rods 146 are connected to the inner ends of the lower control arms 20 for shifting the lower control arms 20 transversely of the vehicle 10 in response to oscillation of the pivot plate 68, the inner ends of the lower control arms 20 being pivotally supported from pivot shafts 154 similar to the pivot shaft 120 and secured to the bight portion 130 by means of fasteners (not shown) similar to fasteners 122 secured through the pivot shaft 154 and the apertures 132 formed in the bight portion 130.

The upper end of a coil spring 156 is seated in each seat portion 116 and a resilient limit member 158 is provided on each end of the front axle assembly for engagement by a corresponding upper control arm 18 while a lower limit member is supported from each lower control arm 20 for engagement with the terminal ends 162 of the front axle assembly 26.

With reference now more specifically to FIGURE 7 of the drawings there will be seen the first modification of the suspension assembly which includes many components which are identical to the components of the suspension assembly illustrated in FIGURES 1–4 and which are referred to by corresponding prime numerals. The support screws 104' of the suspension assembly illustrated in FIGURE 7 comprise substantially the entire means of support of the frame 12' from the axle assembly 26'. A pivot plate corresponding to pivot plate 68 is not provided but instead a mounting bracket 166 is secured to the transverse frame member 16' and has the adjacent ends of the thrust rods 146' pivotally secured thereto. Otherwise, the assembly illustrated in FIGURE 7 is the same as the assembly illustrated in FIGURE 2 and the similarity in the operation of the assembly illustrated in FIGURE 7 in relation to the operation of the assembly illustrated in FIGURE 2 will be set forth more fully hereinafter.

With attention now invited more specifically to FIGURE 8 of the drawings there will be seen a second modification of the suspension assembly whose component parts similar to the component parts of the assembly illustrated in FIGURE 2 of the drawings are designated by double prime numerals. In the assembly illustrated in FIGURE 8 a somewhat modified mounting bracket 168 is utilized and a pair of opposite side mounting brackets 170 are secured to opposite side portions of the transverse frame members 16'' by means of suitable fasteners 172. Shorter thrust arms 174 are provided and have their opposite ends pivotally secured to the corresponding mounting brackets 168 and 170. In the assemblage illustrated in FIGURE 8, the support screws 104'' also comprise substantially the sole support of the frame 12'' from the front axle assembly 26''. Here again, the operation of the assemblage illustrated in FIGURE 8 is very similar to the assemblies illustrated in FIGURES 2 and 7 as will be hereinafter more fully set forth.

Figure 5:
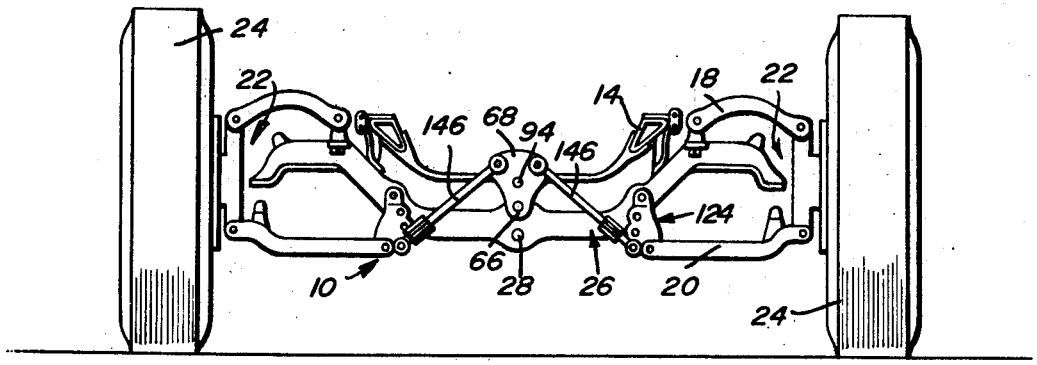
FIGURE 5 is a schematic front elevational view of the suspension assembly of the instant invention with the components thereof in relative positions as though the vehicle was at rest or moving in a straight path.
Figure 6:
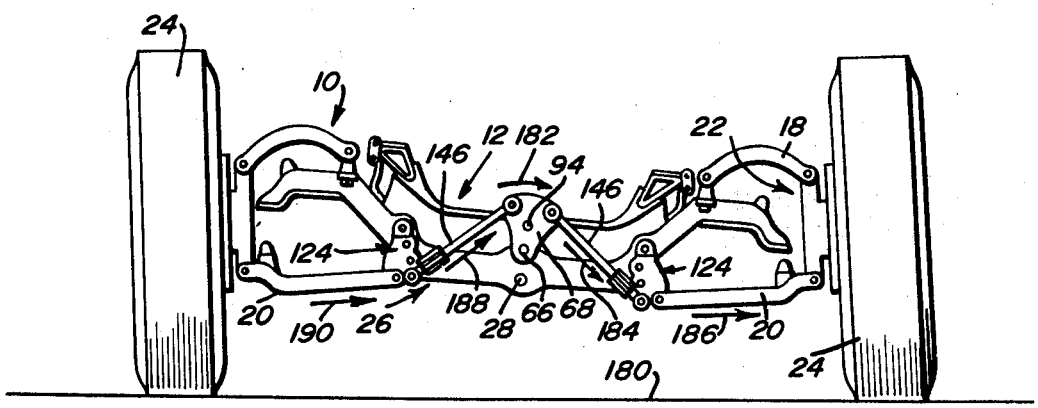
FIGURE 6 is a view similar to FIGURE 5 but illustrating the components of the wheel suspension assembly in relative position they assume when the vehicle is executing a right-hand turn.

With reference now more specifically to FIGURES 5 and 6 of the drawings in addition to the first form of the invention illustrated in FIGURE 2, the normal or rest position of the various components of the suspension assembly are illustrated in FIGURE 5 of the drawings and are experienced when the vehicle 10 is at rest or moving in a straight path. The front wheels 178 journalled from the wheel spindle assemblies 22 are substantially vertically disposed and may have any predetermined positive or negative camber as desired by the manufacturer. However, when the vericle 10 is executing a right-hand turn, as shown in FIGURE 6 (a front view), at sufficient speed to cause the frame 12 to experience inertia forces urging the frame toward the left side of the vehicle 10 due to centrifugal forces, the axle assembly 26 is lowered slightly relative to the roadway 180 on the left hand side of the vehicle 10 due to the heavier loading of that side of the vehicle and the frame 12 tends to shift toward the left relative to the axle assembly 26 and to tilt downwardly more on the left hand side of the vehicle then does the axle assembly 26. In adddition, the frame 12 shifts slightly to the left relative to the axle assembly 26 as the pivot plate 68 oscillates slightly in the direction indicated by the arrow 182 and the oscillation of the pivot plate 68 causes the left-hand thrust rod 146 to push downwardly and outwardly as indicated by the arrow 184 on the left hand mounting bracket 124 so as to swing the lower end thrust outwardly and thus shift the lower control arm 20 on the left-hand side of the vehicle 10 outwardly as indicated by the arrow 186. Of course, oscillation of the pivot plate 68 in the manner designated by the arrow 182 will cause the right-hand thrust rod 146 to pull in the direction of the arrow 188 on the lower end of the right-hand mounting bracket 124 and will thus cause the lower portion of the right-hand mounting bracket 124 to swing inwardly and exert a pull on the right-hand lower control arm 20 in the direction indicated by the arrow 190.

It is believed that it may be readily seen from FIGURE 6 of the drawings that outward displacement of the left-hand lower control arm 20 and inward displacement of the right-hand lower control arm 20 will cause the wheels 17 to be inclined at their upper portions toward the center of the right hand turn being executed by the vehicle 10. Of course, should the vehicle 10 execute a left hand turn, the operation of the suspension assembly is reversed and the wheels 178 have their upper portions inclined toward the right as viewed in FIGURE 6 of the drawings.

With attention now invited more specifically to the first modification illustrated in FIGURE 7, it may be seen that horizontal shifting of the frame 12' relative to the axle assembly 26' will also cause the thrust rods 146 to swing the mounting brackets 124' in the same manner. Also, from FIGURE 8 of the drawings it is believed that it will be readily appreciated that lateral shifting of the frame 12'' relative to the axle assembly 26'' will cause similar swinging movement of the mounting brackets 168 and transverse displacement of the inner ends of the lower control arms 20''.

Further, any tendency for the right hand portion of frame portion 12'' to lower relative to the adjacent end of axle assembly 26'' will also cause the lower end of mounting bracket and thus the inner end of control arm 20'' to shift toward the right as viewed in FIGURE 8.

With attention now invited more specifically to FIGURE 2 of the drawings it may be readily appreciated that the inner end of the lower control arm 20 could be pivotally secured to the axle assembly 26 for oscillation about a fixed axis and that a mounting bracket similar to mounting bracket 124 could be utilized to pivotally secure the inner end of the upper control arm 18 to the axle assembly 26 if such a mounting bracket was inverted and the pivot plate 68 was inverted. Clockwise oscillation of the pivot plate 68 as viewed in FIGURE 2 of the drawings would then cause inward movement of the inner end of the upper control arm 18 as opposed to outward movement of the inner end of the lower control arm 20 and thus still incline the associated wheel inwardly at its upper peripheral portion. Of course, such an inverted mounting bracket could also be utilized on those forms of the invention illustrated in FIGURES 7 and 8 of the drawings if the pivot connection between the inverted mounting bracket and the outer end of the thrust rod 146 was disposed below the axis of rotation of the inverted mounting bracket relative to the axle assembly 26.

The foregoing is considered as illustrative only of the principles of the invention.

What is claimed as new is as follows:

1. In combination, a frame portion, an elongated transverse axle assembly oscillatably supported from said frame portion for limited oscillation about a longitudinal center axis spaced below said frame portion in response to transverse inertia forces acting upon said frame, said axle assembly including a portion spaced below said frame portion and shiftable transversely of said center axis, upper and lower control arms extending transversely of said center axis and having upper and lower portions of a wheel spindle assembly pivotally supported between the outer ends thereof for oscillation about axes generally paralleling said center axis, the inner end of one of said arms being pivotally supported from said axle assembly portion for oscillation about an axis generally paralleling said center axis and the inner end of the other of said arms being pivotally supported from said axle assembly for oscillation about an axis generally paralleling said center axis, and means opeartively connected between said frame portion and said axle assembly portion operative to shift the latter relative to said axle assembly so as to relatively inwardly and outwardly displace the outer ends of the upper and lower control arms, respectively, in relation to said center axis in response to shifting, of said frame portion relative to said axle assembly toward said spindle assembly.

2. The combination of claim 1 wherein said one arm comprises said lower arm and said means is operative to shift the axis of oscillation of said lower arm relative to said axle assembly portion inwardly toward said center axis in response to shifting of said frame portion toward said wheel spindle assembly.

3. The combination of claim 1 wherein said wheel spindle assembly is also supported from the outer ends of said arms for oscillation about an upstanding axis extending between the vertically spaced outer ends of said arm.

4. The combination of claim 1 including a support member having a first portion pivotally supported from said axle assembly for oscillation about an axis generally paralleling said center axis, a second portion of said support member spaced vertically relative to said first portion and comprising said axle assembly portion, said means operatively connected between said frame portion and said axle assembly portion comprising a thrust bar extending transversely of said center axis and having its opposite ends oscillatably connected to said frame portion and axle assembly portion.

5. The combination of claim 4 wherein said thrust bar includes means whereby its effective length may be adjusted.

6. The combination of claim 1 including a support member having a first portion pivotally supported from said axle assembly for oscillation about an axis generally paralleling said center axis, a second portion of said support member spaced vertically relative to said first portion and comprising said axle assembly portion, said means operatively connected between said frame portion and said axle assembly portion comprising a thrust bar extending transversely of said center axis and having its opposite ends oscillatably connected to said frame portion and axle assembly portion, said support member and the adjacent end of said thrust bar including coacting means for adjusting the distance between the axis of oscillation of said support member relative to said axle assembly and the axis of oscillation of said thrust bar relative to said support member.

7. In combination, a vehicle wheel suspension assembly including a vehicle body supporting frame portion, a running gear supporting structure from which said frame portion is supported for limited lateral oscillation about a longitudinal center axis spaced below said frame portion in a generally horizontal direction, upper and lower control arms extending transversely of said axis and having upper and lower portions of a wheel spindle assembly pivotally supported between the outer ends thereof for oscillation about axes generally paralleling said center axis, the inner end of one of said arms being pivotally supported from a portion of said supporting structure for swinging relative to the latter about an axis spaced above said inner end and generally paralleling said center axis, and means pivotally connecting the inner end of the other of said arms to said supporting structure for oscillation about an axis generally paralleling said center axis, and means operative to transversely shift the axis defining the connection between the one arm and said supporting structure in response to oscillation of said supporting structure relative to said frame portion.

8. The combination of claim 7 wherein said supporting structure comprises one end portion of a transverse axle assembly whose mid-portion is oscillatably supported from said frame portion for oscillation about an axis generally paralleling said center axis.

9. The combination of claim 8 including an upstanding connecting member pivotally secured at vertically spaced points to said mid portion of said axle assembly and said frame portion for oscillation about axes generally paralleling said center axis and defining the major point of connection between said axle assembly and said frame portion.

10. The combination of claim 1 including an upstanding connecting member oscillatably supported from said supporting structure and to which the inner end of said other arm is oscillatably connected at vertically spaced points for oscillation about axes generally paralleling said center axis, said means operative to transversely shift the axis of oscillation of said inner end of said other arm comprising a thrust bar whose opposite ends are pivotally supported from said frame portion and said connecting member at a point spaced from the axis of oscillation of said connecting member relative to said supporting structure.

11. In combination, a vehicle wheel suspension assembly including a vehicle body supporting frame portion, an elongated transverse axle assembly from which said frame portion is supported for limited lateral oscillation about a longitudinal center axis spaced below said frame portion, pairs of upper and lower control arms carried by opposite end portions of said axle assembly, an upstanding ground wheel supporting structure pivotally secured at its upper and lower ends to the outer ends of each pair of upper and lower control arms, the inner ends of a first pair of corresponding arms of said pairs of arms being oscillatably supported from corresponding ends of said axle assembly for oscillation about axes stationarily positioned relative to said axle assembly and the inner ends of the other pair of corresponding arms of said pairs of arms being oscillatably supported from the corresponding ends of said axle assembly for oscillation about axes shiftable longitudinally of said axle assembly and spaced above said inner ends of said other pair of arms, and means operative to shift the last mentioned axes so as to relatively inwardly and outwardly displace the outer ends of the upper and lower control arms, respectively, in relation to said center axis in response to lateral oscillation of said frame portion relative to said axle assembly.

References Cited

UNITED STATES PATENTS

| 2,788,984 | 4/1957 | Kolbe | 280—112 |
| 3,137,513 | 6/1964 | Marot | 280—112 |

FOREIGN PATENTS

| 1,214,100 | 4/1966 | Germany. |

KENNETH H. BETTS, Primary Examiner

U.S. Cl. X.R.

280—112